July 10, 1973 R. D. PACKARD 3,745,082

SEMICONDUCTOR SURFACE PROTECTION MATERIAL

Filed June 5, 1970

INVENTOR
RICHARD D. PACKARD

BY Herbert E Jamer
ATTORNEY 3,745,082
Patented July 10, 1973

3,745,082

SEMICONDUCTOR SURFACE PROTECTION MATERIAL

Richard D. Packard, Brighton, Mass., assignor to the United States of America as represented by the National Aeronautics and Space Administration Filed June 5, 1970, Ser. No. 43,883
Int. Cl. H01b *1/04*
U.S. Cl. 156—285 2 Claims

ABSTRACT OF THE DISCLOSURE

A method and a product for protecting semiconductor surfaces is disclosed. The protective coating material is prepared by heating a suitable protective resin with an organic solvent which is solid at room temperature and converting the resulting solution into sheets by a conventional casting operation. Pieces of such sheets of suitable shape and thickness are placed on the semiconductor areas to be coated and heat and vacuum are then applied to melt the sheet and to drive off the solvent and cure the resin. A uniform adherent coating, free of bubbles and other defects, is thus obtained exactly where it is desired.

ORIGIN OF THE INVENTION

The invention described herein was made by an employee of the United States Government and may be manufactured and used by or for the Government for governmental purposes without playment of any royalties thereon or therefor.

BACKGROUND OF THE INVENTION

The invention relates to the application of protective coatings to the exposed p-n junctions of semiconductors, and more specifically, to the use of semiconductor coating materials that do not contain low boiling solvents.

After the p-n junction surfaces of a semiconductor have been etched, rinsed and dried, a protective coating, frequently a silicone resin, is applied. The prior art coating materials are varnish-like compositions, usually silicone resins dissolved in toluene, xylene, or the like. The varnishes are quite viscous and are therefore difficult to meter for application and to apply in spatially restricted areas without smearing. Frequently, such coatings do not flow well enough to cover the surface to be protected in a uniform manner without the use of temperatures that may damage devices such as those encapsulated in molded plastic. If the quantity of such coating material deposited in a restricted area is great enough, volatile material may evolve during the "second sealing" (sealing in the other electrical lead and contact) despite the use of vacuum and elevated temperatures in the curing operation.

SUMMARY OF THE INVENTION

This invention relates to a method and a product for protecting semiconductor surfaces without the use of the prior art varnishes which contain low boiling solvents. In accordance with this invention, a suitable protective resin is added to an organic solvent which is solid at room temperature, the mixture is melted and mixed thoroughly, and it is then cast to form sheets. A piece of such a sheet of suitable shape and thickness is placed on the surface to be protected, and heat and vacuum are applied to melt the solid solvent-resin mixture to spread it over the surface, to drive off the solvent and to cure the resin.

This method of applying protective resins to surfaces eliminates the use of the vsicous varnish-type resins which are difficult to apply accurately in spatially restricted areas. It does not require possibly harmful high temperatures to spread the resin over the surface and there is no residual volatile material to be released during the second sealing operation.

It is therefore an object of this invention to protect semiconductor surfaces by applying a sheet of a mixture of a resin and a solid organic solvent, melting the mixture and heating under a vacuum to expel the solvent and cure the resin in place.

It is another object of this invention to provide a sheet of a solid organic solvent resin mixture for use in protecting semiconductor surfaces.

It is a further object of this invention to provide semiconductor protective coating material in a form which makes possible precise and neat application to the surface to be protected.

BRIEF DESCRIPTION OF THE DRAWINGS

The above objects and others will become apparent from the following detailed description of the invention when read in conjunction with the annexed drawings in which.

DESCRIPTION OF THE INVENTION

Figure 1:
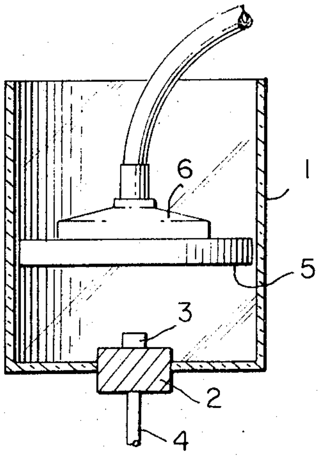
FIG. 1 shows a semiconductor in a glass housing and illustrates the manner in which a piece of solid solvent resin sheet is introduced in position in the housing.

FIG. 1 shows a typical semiconductor consisting of a glass cylinder 1 with a base 2 of a metal alloy having the same coefficient of thermal expansion as the glass hermetically sealed to the cylinder. A diode or rectifier 3 is soldered to the metal base within the glass cylinder and an electrical lead 4 is welded to the base.

Figure 2:
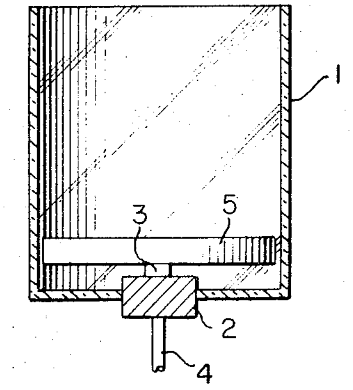
FIG. 2 shows the piece of solid solvent resin sheet in position on the junction of the semiconductor.

A piece of sheet of solid solvent protective resin mixture 5, prepared as hereinafter described and cut so that it just fits within the glass cylinder, is picked up by a vacuum holding device 6 and positioned above the diode or rectifier and the metal base, as shown in FIG. 2.

Figure 3:
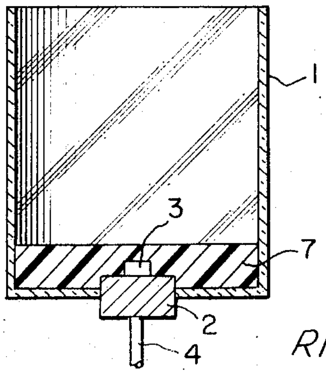
FIG. 3 shows the semiconductor with the protective resin in position about the junction.

Heat is then applied to the solid solvent resin sheet to melt it so that the resin will spread over and about the base and the diode or rectifier. Further heating and the application of vacuum remove the solvent and cure resin 7 in situ, as shown in FIG. 3.

The protective resin used in my invention may be a silicone polymer, a silicone rubber, or an epoxy resin, each well known in the art, and available in the form of various commercial products.

The silicone resins contain the repeating groups

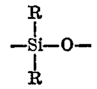

where the R groups may be alkyl, aromatic, hydrogen, chlorine, alkoxy, acyloxy, etc. The silicone rubbers contain the repeating group

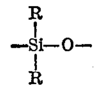

where R may be a monovalent alkyl group containing not over four carbon atoms, or phenyl, tolyl or xylyl groups.

The silicones may be cured or cross-linked by heating with suitable agents, such as ferric chloride, concentrated sulfuric acid, sulfuryl halide, phenyl phosphoryl dichloride, alkoxy phosphoryl dihalides or an acyl peroxide.

Among the conventional silicone compounds which may be used are Dow Corning Sylgard 182, 183, 184 and 185, Dow Corning Silastic 501, 502, 503, 521 and 588, Dow Corning Protective Coating 145 and 630, and Emerson and Cuming Eccosil 4850, their Eccoseal High Q and their Eccocoat pH 7.

The epoxy resins are characterized by the presence of the epoxy group

and are prepared by heating an epoxy intermediate with a curing agent or hardener to form the thermoset resins. Especially suitable resins are those having a molecular weight of about 1000 and an epoxy equivalent (grams of resin containing 1 gram equivalent of epoxide) of about 550 to 700. The curing or hardening agent may be an amine, an acid anhydride or an acid, or an aldehyde condensation product. Latent or heat activated catalysts in which the reactive groups are "blocked" are especially suitable because the use of such agents assures the stability of the epoxy intermediate until heat is applied to cure it.

Dow Corning Company DER epoxy resin is a commercial product especially suitable for use as a protective resin.

The solid organic solvent used should have a melting point of at least about 75° C., preferably within the range of about 75° C. to 130° C., and it should contain no ionic material or groups which would make it electrically conductive. It is well to avoid the use of reactive compounds with double or triple bonds. Various suitable electrically non-conductive solid solvents are listed in the table which follows. Obviously, mixtures of these compounds may be used as solvents.

| Material | Formula | M.P., ° C |
|---|---|---|
| 1,2,4,5-tetramethyl benzene | $C_6H_2(CH_3)_4$ | 80 |
| 2-hydroxycyclohexanone | $C_6H_4(O)(OH)$ | 113 |
| Hexaethylbenzene | $C_6(CH_2CH_3)_6$ | 129 |
| Pentachlorobenzene | $C_6HCl_5$ | 86 |
| Benzene hexachloride | $C_6(Cl)_6$ | 157 |
| Acetoacetanilide | $C_6H_5NH{\cdot}CO{\cdot}CH_2CO{\cdot}CH_3$ | 86 |
| o-Ethoxyacetanilide | $C_6H_4NH(COCH_3)(OC_2H_5)$ | 79 |
| 2,4,6-trichloroaniline | $C_6H_2(NH_2)Cl_3$ | 78.5 |
| 1,2,3-benzenetriamine | $C_6H_3(NH_2)_3$ | 103 |
| 1,2,4-benzenetriamine | $C_6H_3(NH_2)_3$ | 100 |
| N-dichloro-p-toluene sulfuramide | $C_6H_4(CH_3)(SO_2NCl_2)$ | 83 |
| p,p'-Dihydroxydiphenyl carbinol | $C_6H_5(C_6H_4OH)_2COH$ | 100 |
| 1,3-diphenyl benzene | $C_6H_4(C_6H_5)_2$ | 89 |
| a-Hydroxy-4 methoxy-a (4-methoxy-phenyl)acetophenone | $CH_3O(C_6H_4)CH{\cdot}OH{\cdot}CO(C_6H_4)CH_3O$ | 113 |
| 4,4'-dimethylbiphenyl | $(C_6H_4)_2(CH_3)_2$ | 125 |
| 1,1,1-triphenylethane | $(C_6H_5)_3C{\cdot}CH$ | 95 |
| Naphthalene | $C_{10}H_8$ | 80 |
| 2-naphthol | $C_{10}H_7(OH)$ | 123 |
| Anthracene | $C_{14}H_{10}$ | 216 |
| 1-methylanthracene | $C_{14}H_9(CH_3)$ | 85-86 |
| Adonitol | $HOCH_2(C{\cdot}H{\cdot}OH)_3CH_2OH$ | 102 |
| 2,2,3,3-tetramethylbutane | $(CH_3)_3C{\cdot}C(CH_3)_3$ | 104 |
| 1,7,7-trimethylcyclo(2,2,1)hept-2-ene | $C_{10}H_{16}$ | 113 |

Sheets of solid solvent-protective resin for use in the application of coatings may be prepared by melting a solid solvent or a mixture of solid solvents and a suitable resin or a mixture of resins, mixing the two thoroughly and then casting a sheet from the mixture, using one of the various methods well known in the art. Thus sheets may be cast by pouring a suitable amount of the melted mixture into a tray and allowing it to cool, or a continuous process, such as the one described and illustrated in Marks "Encyclopedia of Polymer Science and Technology" (volume 5, page 771), may be used. The sheets should be from 0.010" to 0.030" or more more in thickness. The exact thickness will depend on the amount of protective resin required for a particular application. The sheets should contain from about 50% to about 80% of the solvent. Sufficient solvent should be used to dissolve the resin and to give a free flowing solution after melting so that a uniform and firmly adherent coating will be obtained.

The invention will be more thoroughly understood by referring to the following example.

EXAMPLE

Three parts of 1,2,4,5-tetramethylbenzene(durene) and one part of Dow Corning Sylgard 182 by volume, a silicon resin as defined above, are heated together until both have melted. After stirring well a sufficient amount of the mixture is poured into a tray to produce on cooling a sheet 0.025" thick.

Pieces of this sheet, cut so that they will fit into the device to be protected, are used to produce surface coatings as described above.

While the invention has been described with reference to specific embodiments, it will be obvious to those skilled in the art that many changes and modifications can be made in the light of the above teachings. For example, the liquid (toluol) solvent of a liquid varnish such as Dow Corning Silicone Varnish 997 may be replaced by one of the named solid solvents since 997 is a superior high-voltage protective coating. Accordingly, it is to be understood that the invention can be practiced otherwise than as specifically described without departing from the spirit and the scope of the appended claims.

What is claimed is:

1. The method of applying a protective coating to a semiconductor surface comprising:

(a) forming a sheet containing 50 to 80 volume percent of a nonconductive organic solvent having a melting point of 75° C. to 130° C., said solvent being selected from the group consisting of naphthalene, anthracene and benzene substitution products containing saturated alkyl, phenyl and substituted phenyl, halogen, amine or hydroxyl groups, and the balance a protective material selected from the group consisting of silicone resins, silicone rubbers and epoxy resins;

(b) placing a piece of said sheet in contact with said surface;

(c) heating said sheet until the protective material and organic solvent flow and cover said surface; and (d) heating the protective material and organic solvent under vacuum to expel the solvent and cure the protective material in situ.

2. A method according to claim 1 in which the solid solvent is 1,2,4,5-tetramethylbenzene and the resin is a silicone resin or a silicone rubber.

References Cited

UNITED STATES PATENTS

| | | | |
|---|---|---|---|
| 3,473,959 | 11/1969 | Ehinger | 117—201 |
| 3,288,742 | 11/1966 | Donatelli | 260—30.4 |
| 3,466,214 | 9/1969 | Polk | 156—306 X |
| 3,160,520 | 12/1964 | Jäntsch | 117—201 X |
| 3,458,351 | 7/1969 | Held | 117—201 X |
| 3,496,427 | 2/1970 | Lee | 260—29.1 |

GEORGE F. LESMES, Primary Examiner

M. E. McCAMISH, Assistant Examiner

U.S. Cl. X.R.

117—123, 201, 229; 156—306; 161—206, 208, 407; 260—30.4 SB, 33.4 SB, 37 SB, 448.2; 264—92